United States Patent [19]

Cointot

[11] 4,190,741

[45] Feb. 26, 1980

[54] METHOD AND DEVICE FOR RECEIVING AN INTERFACE SIGNAL

[75] Inventor: Denis F. Cointot, Paris, France

[73] Assignee: Societe Anonyme de Telecommunications, Paris, France

[21] Appl. No.: 954,536

[22] Filed: Oct. 25, 1978

[30] Foreign Application Priority Data

Oct. 28, 1977 [FR] France ............................ 77 32576

[51] Int. Cl.$^2$ ........................... H04J 3/06; H04L 7/02
[52] U.S. Cl. .............................. 179/15 BS; 178/69.1;
179/15 BD; 325/38 A
[58] Field of Search .............. 179/15 BS, 15 BY;
178/69.1; 325/38 A; 179/15 BD

[56] References Cited

U.S. PATENT DOCUMENTS

| | | | |
|---|---|---|---|
| 3,828,346 | 8/1974 | Forster | 325/38 A |
| 3,863,025 | 1/1975 | Gonsewski | 325/38 A |
| 3,967,060 | 6/1976 | Subramanian | 178/69.1 |
| 4,041,392 | 8/1977 | Gauriat | 325/38 A |
| 4,071,692 | 1/1978 | Weir | 178/69.1 |

Primary Examiner—David L. Stewart
Attorney, Agent, or Firm—Sandler & Greenblum

[57] ABSTRACT

A method of receiving a codirectional interface digital signal coded in bipolar form, each data bit being represented by means of four bits (1,1,0,0) for a binary "1" and (1,0,1,0) for a binary "0", a polarity alternation being effected every bit with a violation of polarity at each octet, comprising the steps of: separating the interface signal into its positive and negative components; producing a rectified signal from the said components; deriving from the rectified signal a bit timing signal; deriving the decoded data signal from the rectified signal and the timing signal; deriving from said components a signal representing the alternations of polarity; deriving from this latter signal and from the bit timing signal an octet timing signal; and comparing in phase the bit timing signal and the polarity alternation signal, a pulse for rephasing the bit timing signal being produced when the states of these two signals do not coincide at the time of a polarity alternation.

2 Claims, 5 Drawing Figures

METHOD AND DEVICE FOR RECEIVING AN INTERFACE SIGNAL

The present invention relates to the digital transmission of data channels, and more particularly to the reception of data transmitted by means of 64 kbit/s codirectional interfaces.

The purpose of a 64 kbit/s interface is to connect a local data adapter unit to a user, such as a multiplexer-demultiplexer. This local data adapter unit may be a local data multiplexer or a transmission unit connected to a remote multiplexer. A 64 kbit/s interface has been defined in Notice G703 of the CCITT (International Telephone and Telegraph Consultative Committee). Such as interface may be codirectional or contra-directional. A codirectional interface transmits the data signal as well as the timing signals to the user equipment by the local data adapters and reversely, the data and timing signals of the user are transmitted towards the local data adapter. Such a 64 kbit/s interface transmits three signals: a 64 kbit/s data signal coded in bipolar code, a 64 kHz binary element (bit) timing signal and an 8 kHz octet synchronisation signal. A 64 kHz codirectional interface further ensures the transmission of the timing signals in the same sense as the information signal. Five coding steps define this interface:

A bit period is divided into four time intervals

A binary "1" is coded by means of the four bits (1,1,0,0)

A binary "0" is coded by means of the four bits (1,0,1,0)

The binary signal is converted into a three-level signal by alternating the polarity of consecutive bits.

The polarity of these bits is violated every eighth bit, i.e. the first bit in each octet.

The transmitting and receiving devices of such a 64 kbit/s interface are formed of logical elements making it possible, at transmission, by means of timing signals and the data signal, to form the bipolar signal which is transmitted in line and, at reception, to receive a bipolar signal and to derive therefrom the three data, bit timing, octet timing signals. A monostable multivibrator usually allows recovery of the 64 kHz bit clock at reception. Such a system effectively enables the frequency of the clock to be recovered, but does not make it possible, in all cases, to determine without ambiguity the phase of the 64 kHz clock. In fact, when the signal received is in the form of a square waveform of frequency 128 kHz, for example when several binary "0"s occur in succession, it is not possible to determine the phase of the 64 kHz clock.

The object of the present invention is to obviate this drawback and to enable the phase of the timing signal to be determined even in the presence of binary "0"s.

According to the invention, the bit timing signal and a signal representing the polarity alternations of the interface signal are compared in phase. If, at the time of an alternation, the states of these signals do not coincide, a pulse will be transmitted to rephase said timing signal.

The invention will be more readily understood on reading the following description with reference to the accompanying drawings, in which.

The following specification is directed to a 64 kbit/s codirectional interface in accordance with Notice G703 of the CCITT, but the invention is, of course, not limited to this particular frequency.

Figure 1:
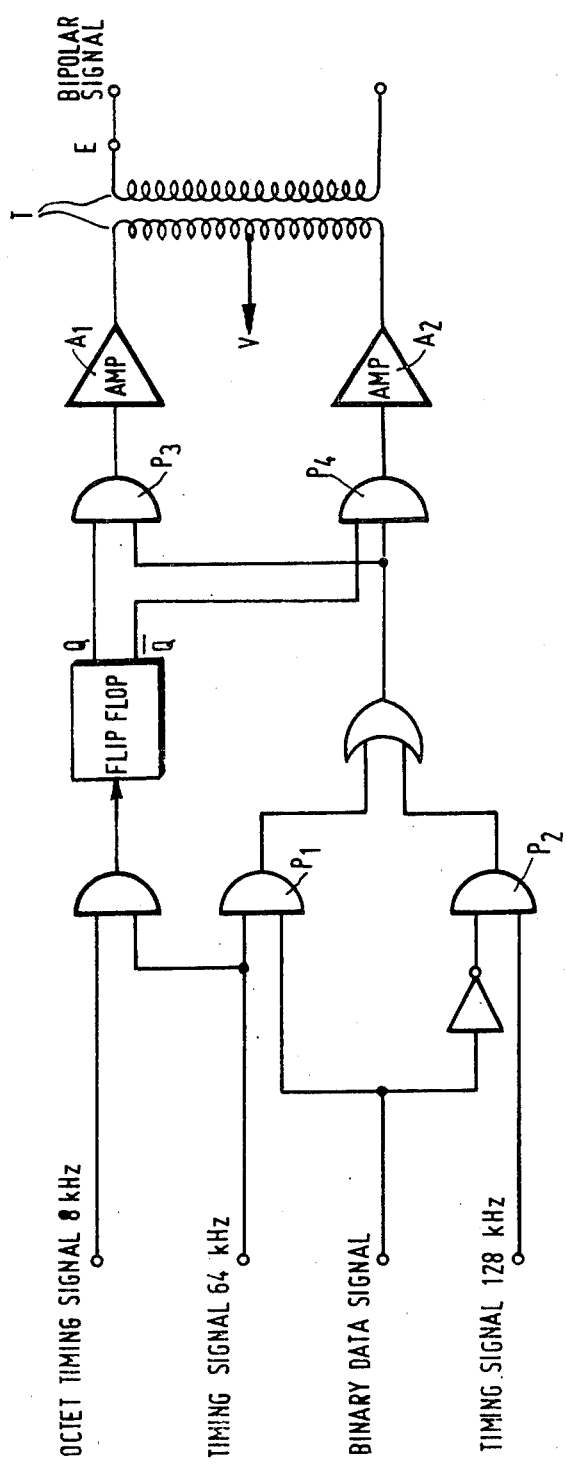
FIG. 1 is a block diagram of the transmitting device of a 64 kbit/s codirectional interface

Referring now to the drawings, FIG. 1 shows the transmitting device of the interface, which comprises two AND gates $P_1$ and $P_2$ each receiving the data signal in binary code and the respective timing signal. Thus gate $P_2$ receives the data signal S and a timing signal of frequency 128 kHz, whilst gate $P_1$ receives the signal S and a timing signal of frequency 64 kHz. The binary "0"s and the binary "1"s are thus converted into groups of four bits which are then transmitted alternately by two AND gates $P_3$ and $P_4$, connected on the other hand to the respective outputs of a flip-flop connected to an AND gate which receives the 64 kHz timing signal and the octet timing signal of frequency 8 kHz. The output signals of the gates $P_3$ and $P_4$, after amplification in amplifiers $A_1$ and $A_2$, are respectively applied to the upper and lower parts of the primary winding of a transformer T of which the centre point is at a fixed positive potential. The signal E transmitted in line and collected at the terminals of the secondary winding is thus a bipolar signal presenting the five coding characteristics in accordance with the recommendations of the CCITT. A bit period is divided into four unit intervals. A binary "1" is coded by means of the four bits (1,1,0,0). A binary "0" is coded by means of the four bits (1,0,1,0). The bipolar signal is a three-level signal presenting an polarity alternation of the consecutive bits. The polarity of these bits is violated every eighth bit, i.e. at the first bit of each octet.

Figure 2:
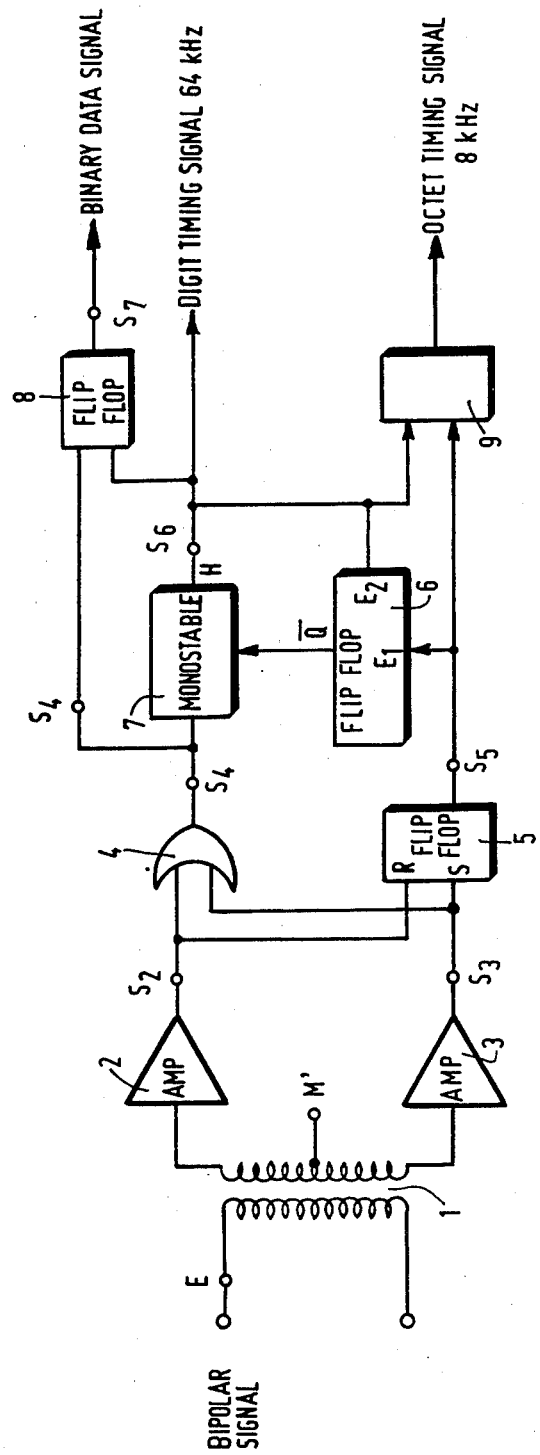
FIG. 2 is a block diagram of the receiving device of this interface
Figure 3:
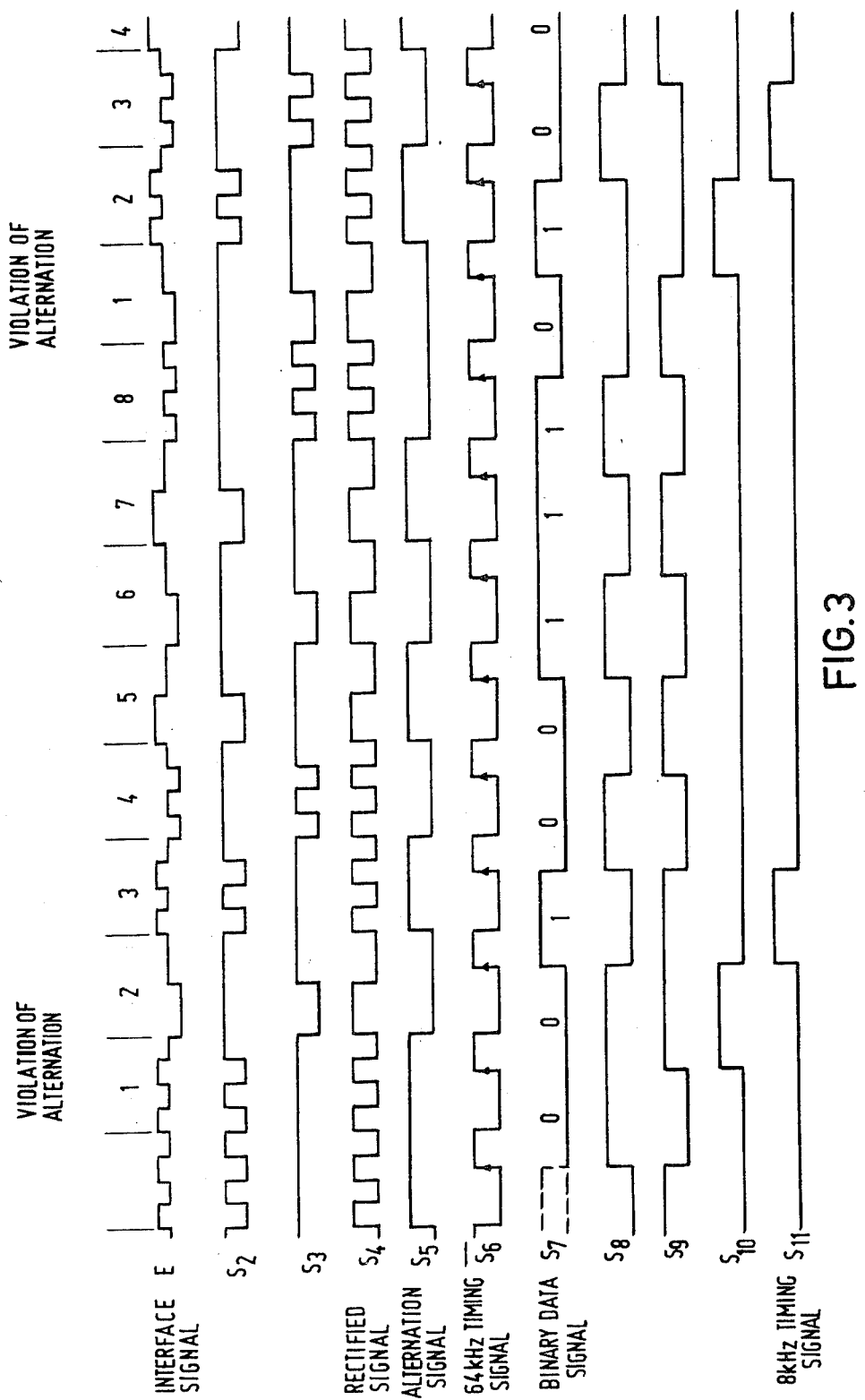
FIG. 3 is a timing chart illustrating the operation of the receiving device of FIG. 2.

The receiving device of the interface shown schematically in FIG. 2 comprises at its input a transformer 1 of which the primary winding receives the signal E transmitted in line. The transformer 1 thus delivers to the amplifier-inverters 2 and 3 respectively the positive and negative components of the signal E, the centre point M' of the secondary winding of this transformer being taken to a fixed potential. In view of the alternation between successive bits in the signal E, this comes to transmitting the bits of an octet alternately on two channels. This is illustrated by the timing chart of FIG. 3, which shows the input signal E and the signals $S_2$ and $S_3$ obtained at the output of the amplifiers 2 and 3. The signals $S_2$ and $S_3$ are then applied to a NOR gate 4 which delivers a rectified bifrequency signal $S_4$.

The signal $S_4$ is then applied on the one hand to the input of a monostable multivibrator 7 and on the other hand to the input of a flip flop 8.

The period of the monostable multivibrator 7 is chosen to range between one half and three quarters of the period of the 64 kHz clock, for example equal to two thirds of this period. Thus, the monostable multivibrator 7 is triggered at each rising edge of the 64 kHz clock or by one rising edge out of two of the 128 kHz clock, and it delivers a timing signal $S_6$ of frequency 64 kHz. The timing signal $S_6$ is also applied to the clock input of the flip-flop 8 which supplies at its output $\bar{Q}$ the data signal $S_1$ expressed in the form of a binary signal NRZ, the signals $S_4$ being applied on its input D.

The timing signal $S_6$ of frequency 64 kHz is also fed in a device 9, described in greater detail hereinafter, which supplies the octet synchronisation signal of frequency 8 kHz. This synchronisation signal of frequency 8 kHz is obtained, as will be explained hereinafter, by the bipolarity violation information.

However, such a device does not make it possible to know, without ambiguity, the phase of the 64 kHz clock. When the signal $S_4$ is a signal formed by a succession of binary "0"s, it is not possible to determine the phase of the edge triggering the monostable multivibrator 7. It is only upon the appearance of a binary "1" that the monostable multivibrator is capable of ascertaining whether the 64 kHz clock is phased on the beginning of the time interval of a bit. In order to eliminate this ambiguity, a flip-flop 5 is provided, of the R-S type, for example, which receives the signals $S_2$ and $S_3$ respectively on its inputs R and S and which delivers a signal $S_5$ of frequency 32 kHz. A flip-flop 6 receives the signal $S_5$ at its input $E_1$ and, on its input $E_2$, the timing signal $S_6$ of frequency 64 kHz and of undetermined phase transmitted by the monostable multivibrator 7.

Figure 4:
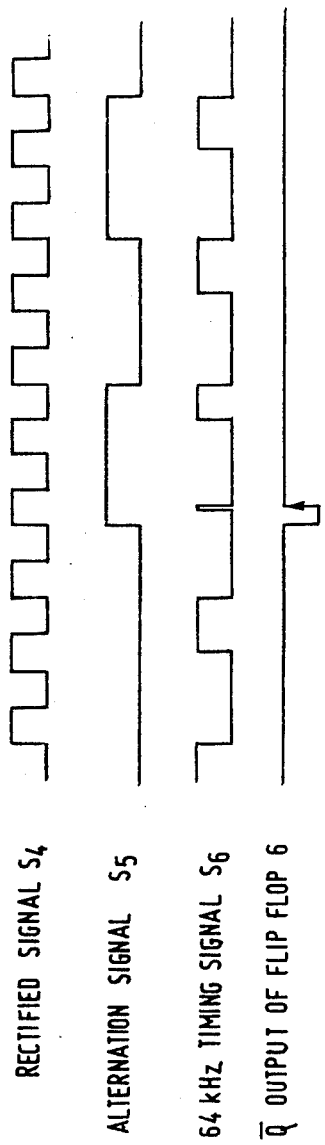
FIG. 4 is a timing chart showing the wave forms obtained on transmission of a series of "0"s.

Let us assume that the data signal $S_4$ received by the monostable multivibrator 7 is formed by a series of binary "0"s as shown in FIG. 4. The monostable multivibrator 7 may be triggered by the first or by the second edge contained in a bit period. However, the flip-flop 6 compares the state of the signal $S_6$ at each rising edge of the signal $S_5$, and it supplies a transition only if a rising edge of the signal $S_5$ is produced whilst $S_6$ is in the "0" state. Following this transition, the monstable multivibrator normally returns to the "1" state (return to 0 of $\overline{S_6}$ in FIG. 4). This provokes a change of state of the flip-flop 6 which in turn triggers the return of the monostable multivibrator 7 to the "0" state. Thus the monostable multivibrator 7 is rephased. On the contrary, when the rising edge of the signal $S_5$ is produced during a "1" state of $S_6$, the flip-flop 6 does not deliver a signal for return to zero of the monostable multivibrator 7.

FIG. 4 shows the two changes of state of the monostable multivibrator 7 with a certain spacing for the sake of clarity, but in fact they are virtually simultaneous.

The signal $S_5$ is also used for recovering the synchronisation signal of frequency 8 kHz. In fact, the signal $S_5$ is cut by a transition edge upon each bipolarity violation. The device 9 mixes this signal $S_5$ with the same signal delayed by a complete period by means of an exclusive NOR gate and supplies at its output the 8 kHz synchronisation signal.

Figure 5:
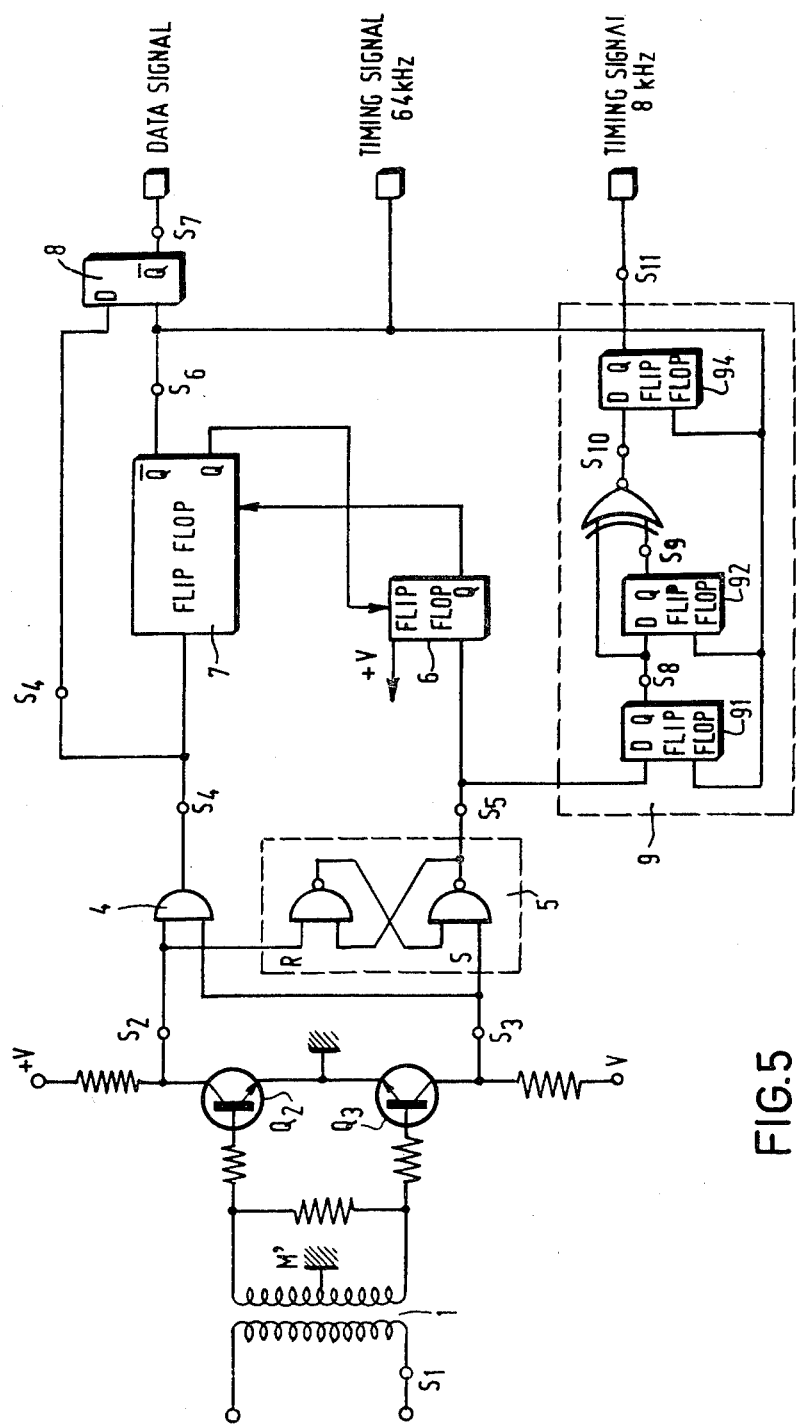
FIG. 5 shows an embodiment of the receiving device of FIG. 2.

FIG. 5 shows an embodiment of the receiving device of the interface in TTL technology. The amplifiers 2 and 3 are in the form of transistors Q2 and Q3 of which the emitters are connected and taken to earth and of which the collectors are connected to the gate 4 as well as to the flip-flop 5. The assembly of the transistors Q2 and Q3 is such that when Q2 is conducting, Q3 is blocked, and vice versa. Thus, the positive pulses are transmitted by the transistor Q2 for example and the negative pulses by the transistor Q3. The R-S type flip-flop 5 is made by means of two inverters, the output of each of them being connected to the input of the other. The flip-flop 8 is for example a D-type flip-flop 91 receiving at its two inputs the signals $S_5$ and $S_6$ and delivering at its output Q a signal $S_8$. A second flip-flop of type D 92 receives the signal $S_8$ and supplies at its output Q a signal $S_9$. The signals $S_8$ and $S_9$ are connected and inverted in a gate 93 to form the signal $S_{10}$. A D-type flip-flop 94 finally derives from signal $S_{10}$ a timing signal $S_{11}$ of frequency 8 kHz, in phase.

The invention has been described using the composite signal of frequency 32 kHz; a composite signal of different frequency could also be used without altering the principle of the invention. It suffices to use the phase information contained in at least one bipolarity alternation for each octet.

Such a device may of course be produced according to the C-MOS technology with the same principle.

The invention applies to the reception of interface signals coded in bipolar code used in digital equipment such as the 30-channel PCM equipment.

What I claim is:

1. A method of receiving a codirectional interface digital signal coded in bipolar form, each data bit being represented by means of four bits (1,1,0,0) for a binary "1" and (1,0,1,0) for a binary "0", a polarity alternation being effected every bit with a violation of polarity at each octet, comprising the steps of: separating the interface signal into its positive and negative components; producing a rectified signal from the said components; deriving from the rectified signal a bit timing signal; deriving the decoded data signal from the rectified signal and the timing signal; deriving from said components a signal representing the alternations of polarity; deriving from this latter signal and from the bit timing signal an octet timing signal; and comparing in phase the bit timing signal and the polarity alternation signal, a pulse for rephasing the bit timing signal being produced when the states of these two signals do not coincide at the time of a polarity alternation.

2. A device for receiving a codirectional interface digital signal coded in bipolar form, each data bit being represented by means of four bits (1,1,0,0) for a binary "1" and (1,0,1,0) for a binary "0", a polarity alternation being effected every bit, with a violation of polarity at each octet, and device comprising a transformer of which the secondary winding comprises a central point at a fixed potential, for separating the interface signal into its positive and negative components, a gate for delivering a rectified signal from said positive and negative components, a monostable multivibrator delivering a bit timing signal from the rectified signal, a first flip-flop deriving from the rectified signal and the timing signal the decoded data signal, a second flip-flop deriving, from said positive and negative components, a signal representing the polarity alternations, a circuit connected to the monostable multivibrator and to the second flip-flop for delivering an octet timing signal, and a third flip-flop receiving at its inputs the timing signal from the monostable multivibrator and the signal from said second flip-flop, said third flip-flop delivering a rephasing pulse to the monostable multivibrator when the states of its two inputs signals do not coincide at the time of a polarity alternation.

* * * * *

UNITED STATES PATENT AND TRADEMARK OFFICE
CERTIFICATE OF CORRECTION

PATENT NO. : 4,190,741
DATED : February 26, 1980
INVENTOR(S) : Denis F. Cointot

It is certified that error appears in the above-identified patent and that said Letters Patent are hereby corrected as shown below:

Column 1, line 16: "as" should read ---an---;
Column 2, line 68: "signals" should read ---signal---;
Column 4, line 43: "and" should read ---said---;
Column 4, line 60: "inputs" should read ---input---.

Signed and Sealed this

Seventeenth Day of June 1980

[SEAL]

Attest:

SIDNEY A. DIAMOND

*Attesting Officer*  *Commissioner of Patents and Trademarks*